(12) United States Patent
Jiang

(10) Patent No.: US 6,564,675 B1
(45) Date of Patent: May 20, 2003

(54) CRANK ARM FOR BICYCLES

(76) Inventor: Cheng-Xun Jiang, No. 487, Guojung Rd., Dali City, Taichung (TW)

( * ) Notice: Subject to any disclaimer, the term of this patent is extended or adjusted under 35 U.S.C. 154(b) by 0 days.

(21) Appl. No.: 10/200,221

(22) Filed: Jul. 23, 2002

(51) Int. Cl.[7] .................................................. G05G 1/14
(52) U.S. Cl. ..................................... 74/594.1; 74/579 R
(58) Field of Search ........................... 74/594.1–594.3, 74/579 R; 264/46.7

(56) References Cited

U.S. PATENT DOCUMENTS

| | | | | |
|---|---|---|---|---|
| 4,183,261 A | * | 1/1980 | Eiselbrecher et al. | 75/579 R |
| 4,811,626 A | * | 3/1989 | Bezin | 74/594.1 |
| 5,435,869 A | * | 7/1995 | Christensen | 156/175 |
| 5,690,034 A | * | 11/1997 | Schahl et al. | 105/199.1 |
| 5,851,459 A | * | 12/1998 | Chen | 264/46.7 |
| 5,941,135 A | * | 8/1999 | Schlanger | 74/594.1 |
| 6,058,803 A | * | 5/2000 | Yamanaka | 74/594.1 |
| 6,314,834 B1 | * | 11/2001 | Smith et al. | 74/594.1 |
| 6,443,033 B1 | * | 9/2002 | Brummer et al. | 74/594.1 |
| 2001/0049976 A1 | * | 12/2001 | Dodman | 74/594.1 |

FOREIGN PATENT DOCUMENTS

FR     2636386     *  3/1990 ................ 74/594.1

* cited by examiner

Primary Examiner—Vinh T. Luong
(74) Attorney, Agent, or Firm—Rosenberg, Klein & Lee

(57) ABSTRACT

A crank arm for bicycles includes two end pieces and a hollow tube connected between the two end pieces. Each of the two end pieces has an engaging hole defined therethrough and an insertion which is inserted in respective one of two ends of the hollow tube. A compound material layer is coated to the outside of the two end pieces and the hollow tube.

2 Claims, 4 Drawing Sheets

CRANK ARM FOR BICYCLES

FIELD OF THE INVENTION

The present invention relates to a crank arm for bicycles and the crank includes two ends with a hollow aluminum tube connected therebetween. An outer layer made of compound material is coated on the tube and the two ends.

BACKGROUND OF THE INVENTION

A modern idea for making a crank arm for bicycles is focused on less weight and high strength. One of the conventional methods for making the crank arm is to make two ends and a hollow tube in separate, each of the two ends has a connection portion which is inserted in the hollow tube and the two connection portions are connected with each other in the hollow tube. The hollow tube is filled with the two connection portions and the weight is still not satisfied. Another conventional crank arm is made from a one-piece metal which is rolled to have the desired shape and structure. It is found that there are two narrow neck portions located close to the two ends and the structural strength and the two narrow necks tend to be broken when suffered by stress.

The present invention intends to provide a crank arm that has a hollow tube and two ends which are connected to the two ends of the tube. A compound material layer is coated to the crank arm to reinforce the structural strength of the crank arm.

SUMMARY OF THE INVENTION

In accordance with one aspect of the present invention, there is provided a crank arm for bicycles, wherein the crank arm comprises a hollow tube with a first end piece and a second end piece connected to two ends of the hollow tube. The first end piece has a first engaging hole defined therethrough and the second end piece has a second engaging hole defined therethrough. Each of the first end piece and the second end piece each have an insertion for being inserted in two ends of the hollow tube. A compound material layer is coated to the outside of the hollow tube, the first end piece and the second end piece.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 4 shows a compound material layer is coated on the crank arm of the present invention.

DETAILED DESCRIPTION OF THE PREFERRED EMBODIMENT

Figure 1:
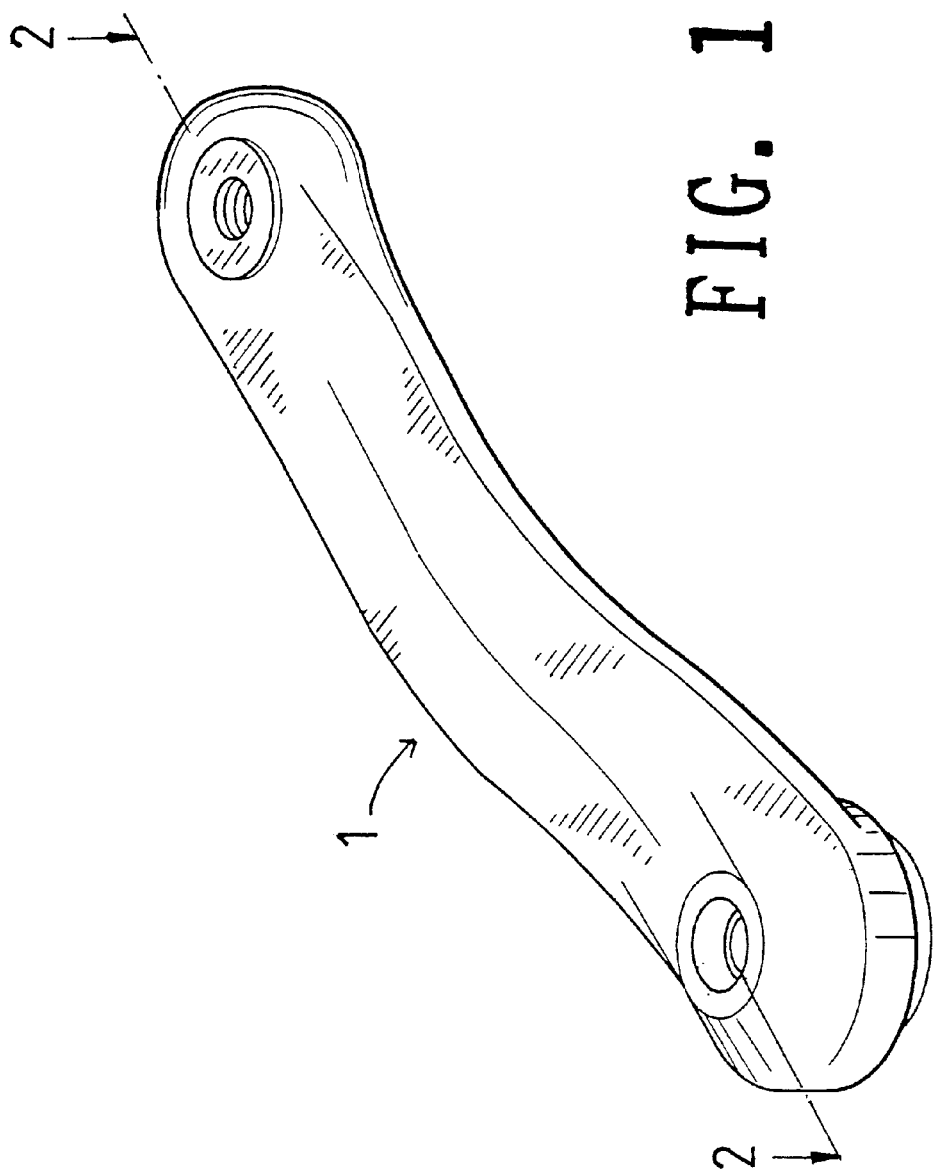
FIG. 1 is a perspective view to show the crank arm of the present invention.
Figure 2:
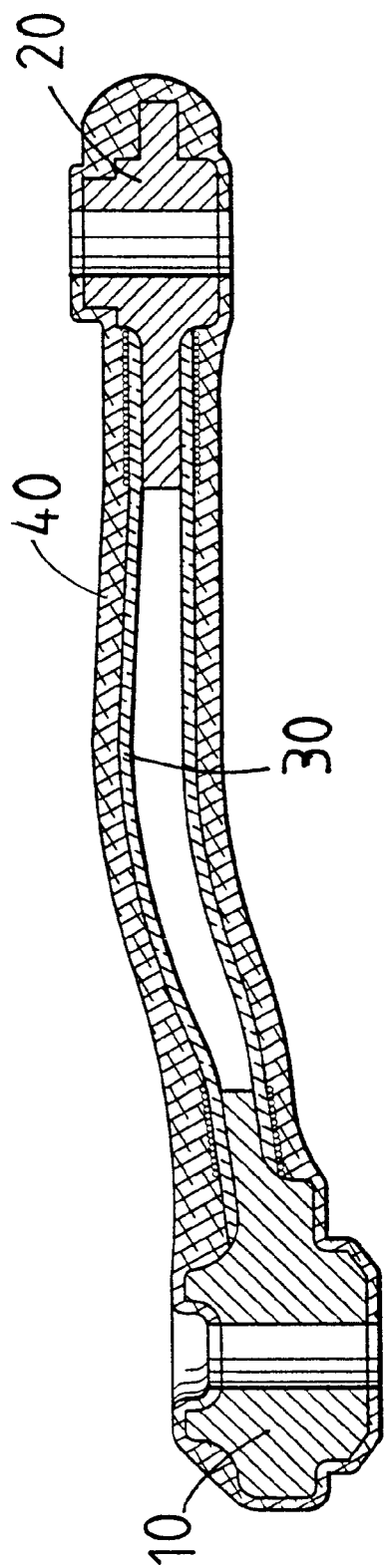
FIG. 2 is a cross sectional view taken by the plane 2—2 in FIG. 2 and shows the crank arm of the present invention.
Figure 3:
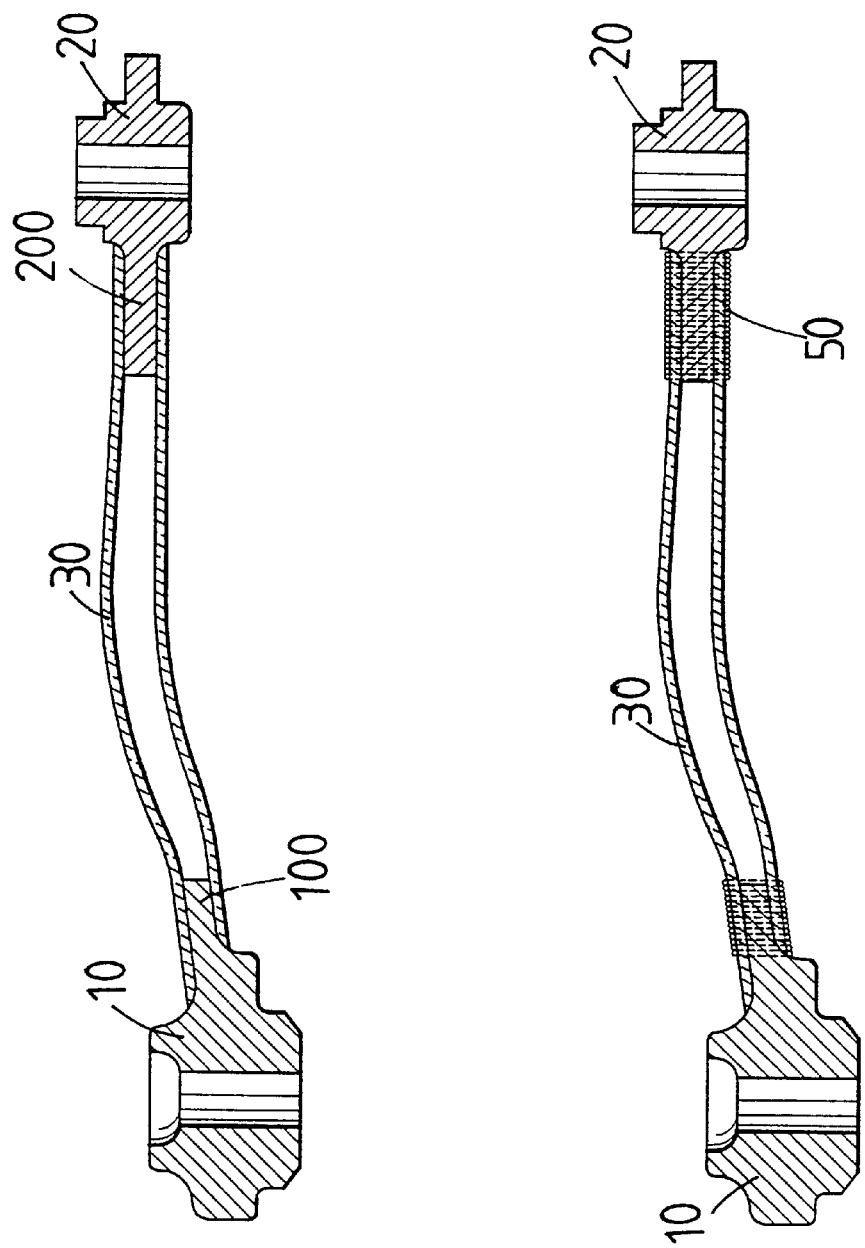
FIG. 3 shows the two end pieces are connected to two ends of the hollow tube by binding strips.
Figures 4A, 4B:
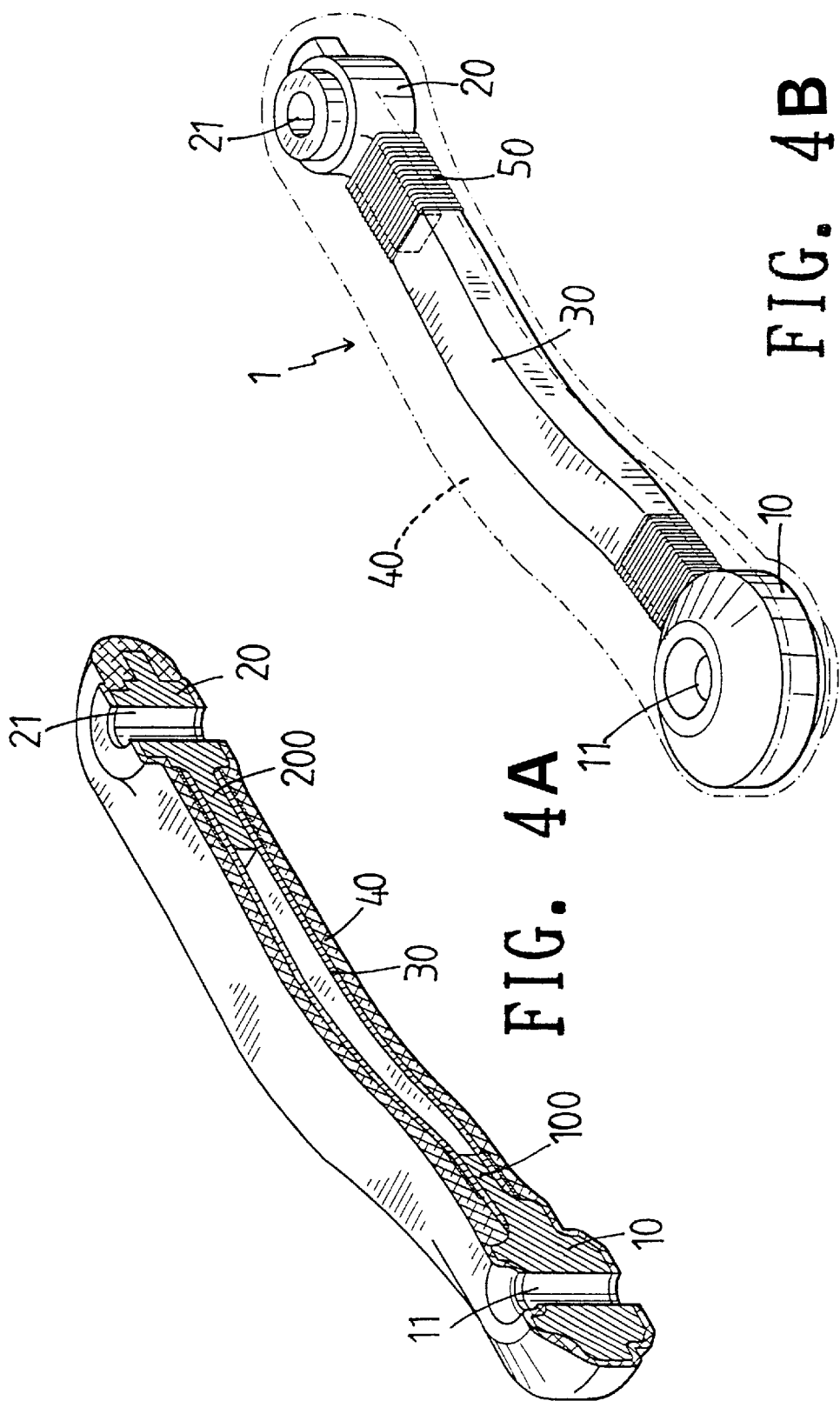
FIG. 4a is a cross sectional view to show a compound material layer is coated on the crank arm of the present invention.
FIG. 4b shows a perspective view of the crank arm of the present invention wherein the compound material layer is shown by dotted lines.

Referring to FIGS. 1, 2, 3, 4a and 4b, the crank arm 1 of the present invention comprises a hollow tube 30 which is made of light and durable material such as Aluminum and has two open ends. A first end piece 10 has a first engaging hole 11 defined therethrough and an insertion 100 extends from the first end piece 10. A second end piece 20 has a second engaging hole 21 defined therethrough and an insertion 200 extends from the second end piece 20. The two insertions 100 and 200 are inserted in the two open ends of the hollow tube 30 and binding strips 50 are used to wrap around the two ends of the hollow tube 30 to secure the insertions 100/200 in the hollow tube 30.

A compound material layer 40 such as carbon-fiber is coated to the outside of the hollow tube 30, the first end piece 10 and the second end piece 20.

The crank arm 1 of the present invention has a hollow tube 30 so that the total weight, is reduced and the two end pieces 10 and 20 are secured to the hollow tube 30 by using binding strips 50 so that the connection of the two end pieces 10 and 20 are securely connected to the hollow tube 30. The binding strips 50 reinforce the structure so that the connection between the hollow tube 30 and the two end pieces 10, 20 are strong enough to bear the stress when the crank arm 1 is used on any type of bicycles.

While we have shown and described the embodiment in accordance with the present invention, it should be clear to those skilled in the art that further embodiments may be made without departing from the scope of the present invention.

What is claimed is:

1. A crank arm for bicycles, comprising:

a hollow tube;

a first end piece having a first engaging hole defined therethrough and a second end piece having a second engaging hole defined therethrough, each of the first end piece and the second end piece each having an insertion which is inserted in two ends of the hollow tube, binding strips wrapped around the two ends of the hollow tube to secure the insertions in the hollow tube, and a compound material layer coated to the outside of the hollow tube, the first end piece and the second end piece.

2. The crank arm as claimed in claim 1, wherein the compound material layer is carbon-fiber.

* * * * *